US012718337B2

(12) United States Patent
Li

(10) Patent No.: US 12,718,337 B2
(45) Date of Patent: Aug. 25, 2026

(54) METHOD FOR CALIBRATING IMAGE DISTORTION, APPARATUS, ELECTRONIC DEVICE AND STORAGE MEDIUM

(71) Applicant: Black Sesame Technologies Inc., San Jose, CA (US)

(72) Inventor: Wenxue Li, Wuhan (CN)

(73) Assignee: Black Sesame Technologies Inc., San Jose, CA (US)

( * ) Notice: Subject to any disclaimer, the term of this patent is extended or adjusted under 35 U.S.C. 154(b) by 711 days.

(21) Appl. No.: 17/751,120

(22) Filed: May 23, 2022

(65) Prior Publication Data

US 2022/0392027 A1 Dec. 8, 2022

(30) Foreign Application Priority Data

Jun. 4, 2021 (CN) ........................ 202110624642.9

(51) Int. Cl.

| | |
|---|---|
| ***G06T 5/00*** | (2024.01) |
| ***G06T 3/00*** | (2024.01) |
| ***G06T 3/12*** | (2024.01) |
| ***G06T 5/80*** | (2024.01) |
| ***G06T 7/13*** | (2017.01) |

(Continued)

(52) U.S. Cl.

CPC .................. *G06T 5/80* (2024.01); *G06T 3/12* (2024.01); *G06T 7/13* (2017.01); *G06T 7/60* (2013.01); *G06T 7/73* (2017.01)

(58) Field of Classification Search

None

See application file for complete search history.

(56) References Cited

U.S. PATENT DOCUMENTS

| | | | |
|---|---|---|---|
| 2019/0166294 A1 | 5/2019 | Ouyang et al. | |
| 2020/0394770 A1* | 12/2020 | Roulet | G06T 7/50 |
| 2021/0192680 A1* | 6/2021 | Masuda | G06V 10/243 |

FOREIGN PATENT DOCUMENTS

| | | | |
|---|---|---|---|
| CN | 101930603 A | 12/2010 | |
| CN | 103140858 A | 6/2013 | |
| CN | 103103426149 A | 12/2013 | |

(Continued)

OTHER PUBLICATIONS

A.K.Sampath, Dr.N.Gomathi, Decision tree and deep learning based probabilistic model for character recognition, Journal of Central South University, vol. 12, 2017, China.

(Continued)

*Primary Examiner* — Andrew H Lam

(74) *Attorney, Agent, or Firm* — Timothy T. Wang; Ni, Wang & Massand, PLLC

(57) ABSTRACT

A method for calibrating image distortion, apparatus, electronic device, and computer readable storage medium are disclosed. The method for calibrating image distortion includes: obtaining an original image captured by a camera; calculating a deformation degree of foreground objects when the original image includes the foreground objects; and performing a distortion calibration and a spherical projection on the original image to obtain a target image when the deformation degree of the foreground objects is greater than a predetermined threshold. The method for calibrating image distortion provided by the disclosure can realize fast distortion calibration of ultra-wide-angle image with low computational complexity and obtain better calibration effect.

12 Claims, 12 Drawing Sheets

(51) Int. Cl.

| | |
|---|---|
| ***G06T 7/60*** | (2017.01) |
| ***G06T 7/73*** | (2017.01) |

(56) References Cited

FOREIGN PATENT DOCUMENTS

| | | | |
|---|---|---|---|
| CN | 105227948 | A | 1/2016 |
| CN | 104020565 | A | 3/2016 |
| CN | 106339987 | A | 1/2017 |
| CN | 109241723 | A | 1/2019 |
| CN | 110636263 | A | 12/2019 |
| CN | 110675350 | A | 1/2020 |
| CN | 111080542 | A | 4/2020 |
| CN | 111080544 | A | 4/2020 |
| CN | 111105366 | A | 5/2020 |
| CN | 112132762 | A | 12/2020 |
| CN | 112258418 | A | 1/2021 |
| CN | 110276734 | A | 3/2021 |
| CN | 112712045 | A | 4/2021 |
| CN | 112102401 | A | 5/2024 |
| EP | 1416441 | A1 | 5/2004 |
| EP | 2538242 | A1 | 12/2012 |
| EP | 2608148 | A2 | 6/2013 |

OTHER PUBLICATIONS

Long Sun, Tao Wu etc., Object Detection Research of SAR Image Using Improved Faster Region-Based Convolutional Neural Network, Journal of Geodesy and Geoinformation Science, vol. 3, China.

Xiaokang Zhou, Peng Rao etc., Research on Distortion Correction Technique of Fish-eye Image, Journal of Industrial Control Computer, vol. 30, Issue 10, 2017, China.

Wei Zhang, Maoyong Cao, Bingwen Zhang, Panoramic Image Mosaic Technology of Multi-Camera Borehole Image Based on Harris Algorithm, Journal of Shandong University of Science and Technology (Natureal Science), vol. 37, Issue 3, Jun. 2018, China.

Kun Zhang, Cui Rong Wang, Correction Algorithm of Fish Eye Lens Image Distortion Based on the Circle Segmentation Approach, Journal of Northeastern University (Natural Science), vol. 32, Issue 9, Sep. 2011, China.

* cited by examiner

METHOD FOR CALIBRATING IMAGE DISTORTION, APPARATUS, ELECTRONIC DEVICE AND STORAGE MEDIUM

CROSS REFERENCE TO RELATED APPLICATION

This patent application claims the benefit and priority of Chinese Patent Application No. 202110624642.9 filed on Jun. 6, 2021 the disclosure of which is incorporated by reference herein in its entirety as part of the present application.

TECHNICAL FIELD

The present disclosure relates to the technical field of image processing, and more specifically, to a method for calibrating image distortion, apparatus, electronic device, and computer readable storage medium.

BACKGROUND ART

Ultra-wide-angle camera module has been integrated in mobile phones currently. The field of view (FOV) of the ultra-wide-angle camera module can generally be greater than 100°, which can obtain a wider shooting field of vision, at the cost of resulting image distortion, especially in the peripheral edge region of the image.

The internal parameters of the camera can be obtained by calibrating the camera module, and the distortion of the input image can be calibrated based on the internal parameters of the camera to eliminate the distortion in the original image. However, if there are foreground objects (such as a portrait) in the original image, the distortion calibration on the original image deforms the foreground object in the target image due to the stretching-like operation of the distortion calibration.

SUMMARY

In view of the above, it is necessary to provide an improved image distortion calibration method, image distortion calibration apparatus, electronic device, and computer readable storage medium.

A first aspect of the disclosure is to provide a method for calibrating image distortion. The method includes the steps as follows:

An original image captured by a camera is obtained.

A deformation degree of a foreground object is calculated when the original image includes the foreground object.

A distortion calibration and a spherical projection are performed on the original image to obtain a target image when the deformation degree of the foreground object is greater than a predetermined threshold.

In an embodiment, the method further includes the steps as follows:

The distortion calibration is performed on the original image to obtain a target image when the original image does not include a foreground object; or The distortion calibration is performed on the original image to obtain a target image when the deformation degree of the foreground object is not greater than the predetermined threshold.

In an embodiment, the step of calculating a deformation degree of the foreground object when the original image includes a foreground object includes as follows.

A foreground object border in the original image, a position parameter of the foreground object border, and a size parameter of the foreground object border is obtained.

The deformation degree of the foreground object border is calculated based on the position parameter of the foreground object border and the size parameter of the foreground object border.

In an embodiment, the position parameter of the foreground object border includes: a distance between the foreground object border and a center point of the original image in the original image. The size parameter of the foreground object border includes: a width of the foreground object border and a height of the foreground object border.

The deformation degree of the foreground object is calculated based on $$S=w_1 \times l_1+w_2 \times l_2$$

Wherein the S is the deformation degree of the foreground object. The $l_1$ is the distance between the foreground object border and the center point of the original image in the original image. The $l_2$ is a larger value of the width of the foreground object border and the height of the foreground object border. The $w_1$ is a first weight value and the $w_2$ is a second weight value.

In an embodiment, the step of performing distortion calibration and spherical projection on the original image to obtain a target image when the deformation degree of the foreground object is greater than a predetermined threshold includes the steps as follows.

A corresponding relationship between pixel points of the target image and pixel points of the original image is calculated based on a spherical projection transformation formula and a distortion calibration transformation formula.

Pixel values of the pixel points of the original image are assigned to the pixel points of the target image corresponding to the pixel points of the original image to obtain pixel values of the pixel points in the target image.

In an embodiment, the step of calculating a corresponding relationship between pixel points of the target image and pixel points of the original image based on a spherical projection transformation formula and a distortion calibration transformation formula includes the steps as follows.

Coordinates $(u_i', v_i')$ of the pixel points are calculated after performing distortion calibration on the original image corresponding to coordinates $(u_i, v_i)$ of the pixel points of the target image based on the spherical projection transformation formula. The pixel points of the target image, the corresponding pixel points after performing distortion calibration on the original image, and a center point of the target image are on a same straight line.

Coordinates $(u_i'', v_i'')$ of the pixel points of the original image corresponding to coordinates $(u_i', v_i')$ of the pixel points after performing distortion calibration on the original image is calculated based on the distortion calibration transformation formula.

The spherical projection transformation formula is:

$$\begin{cases} r_0 = \dfrac{d}{2 * \tan(0.5 * \arctan(d/(2 * f)))} \\ r_2 = f * \tan(2 * \arctan(r_1/r_0)) \end{cases}.$$

Wherein the d is a smaller value in the width and height of the original image. The f is a focal length of the camera. The $r_1$ is a distance from the pixel point of the target image to the center point of the target image. The $r_2$ is a distance from the pixel point of the distortion calibration image to the center point of the target image.

The distortion calibration transformation formula is:

$$\begin{cases} r = \sqrt{u_i'^2 + v_i'^2} \\ x' = u_i' \dfrac{1 + k_1 r^2 + k_2 r^4 + k_3 r^6}{1 + k_4 r^2 + k_5 r^4 + k_6 r^6} + 2p_1 u_i' v_i' + p_2(r^2 + 2u_i'^2) \\ y' = v_i' \dfrac{1 + k_1 r^2 + k_2 r^4 + k_3 r^6}{1 + k_4 r^2 + k_5 r^4 + k_6 r^6} + 2p_2 u_i' v_i' + p_2(r^2 + 2v_i'^2) \\ u_i'' = f_x x' + c_x \\ v_i'' = f_y y' + c_y \end{cases}.$$

Wherein the $f_x$ is a first focal length of the camera. The $f_y$ is a second focal length of the camera. The $c_x$ is a lateral offset of an image origin relative to an optical center imaging point. The $c_y$ is a longitudinal offset of the image origin relative to the optical center imaging point. The $k_1$ is a first radial distortion coefficient of the camera. The $k_2$ is a second radial distortion coefficient of the camera. The $k_3$ is a third radial distortion coefficient of the camera. The $k_4$ is a fourth radial distortion coefficient of the camera. The $k_5$ is a fifth radial distortion coefficient of the camera. The $k_6$ is a sixth radial distortion coefficient of the camera. The $p_1$ is a first tangential distortion coefficient of the camera, and the $p_2$ is a second tangential distortion coefficient of the camera.

A second aspect of the disclosure is to provide an image calibration apparatus, including:

an image obtaining module, configured to obtain an original image captured by a camera;

a deformation calculation module, configured to calculate a deformation degree of a foreground object when the original image includes the foreground object; and a calibration calculation module, configured to perform a distortion calibration and a spherical projection on the original image when the deformation degree of the foreground object is greater than a predetermined threshold to obtain a target image.

In an embodiment, the calibration calculation module is further configured to:

perform the distortion calibration on the original image to obtain the target image when the original image does not include the foreground object; or perform the distortion calibration on the original image to obtain a target image when the deformation degree of the foreground object is not greater than the predetermined threshold.

In an embodiment, the deformation calculation module is further configured to:

obtain a foreground object border in the original image, a position parameter of the foreground object border, and a size parameter of the foreground object border, and calculate a deformation degree of the foreground object border based on the position parameter of the foreground object border and the size parameter of the foreground object border.

In an embodiment, the position parameter of the foreground object border includes: a distance between the foreground object border and a center point of the original image in the original image. The size parameter of the foreground object border includes: a width of the foreground object border and a height of the foreground object border.

The deformation degree of the foreground object is calculated based on $$S = w_1 \times l_1 + w_2 \times l_2.$$

Wherein the S is the deformation degree of the foreground object. The $l_1$ is the distance between the foreground object border and the center point of the original image in the original image. The $l_2$ is a larger value of the width of the foreground object border and the height of the foreground object border. The $w_1$ is a first weight value and the $w_2$ is a second weight value.

In an embodiment, the calibration calculation module includes:

a mapping calculation unit, configured to calculate a corresponding relationship between pixel points of the target image and pixel points of the original image based on a spherical projection transformation formula and a distortion calibration transformation formula; and a pixel assignment unit, configured to assign pixel values of the pixel points of the original image to the pixel points of the target image corresponding to the pixel points of the original image to obtain pixel values of the pixel points in the target image.

In an embodiment, the mapping calculation unit is configured to:

calculate coordinates ($u_i'$, $v_i'$) of the pixel points after performing distortion calibration on the original image corresponding to coordinates ($u_i$, $v_i$) of the pixel points of the target image based on the spherical projection transformation formula, wherein the pixel points of the target image, the corresponding pixel points after performing distortion calibration on the original image, and a center point of the target image are on a same straight line, and calculate coordinates ($u_i''$, $v_i''$) of the pixel points of the original image corresponding to coordinates ($u_i'$, $v_i'$) of the pixel points after performing distortion calibration on the original image based on the distortion calibration transformation formula.

The spherical projection transformation formula is:

$$\begin{cases} r_0 = \dfrac{d}{2 * \tan(0.5 * \arctan(d/(2 * f)))} \\ r_2 = f * \tan(2 * \arctan(r_1/r_0)) \end{cases}.$$

Wherein the d is a smaller value in the width and height of the original image. The f is a focal length of the camera. The $r_1$ is a distance from the pixel point of the target image to the center point of the target image. The $r_2$ is a distance from the pixel point of the distortion calibration image to the center point of the target image.

The distortion calibration transformation formula is:

$$\begin{cases} r = \sqrt{u_i'^2 + v_i'^2} \\ x' = u_i' \dfrac{1 + k_1 r^2 + k_2 r^4 + k_3 r^6}{1 + k_4 r^2 + k_5 r^4 + k_6 r^6} + 2p_1 u_i' v_i' + p_2(r^2 + 2u_i'^2) \\ y' = v_i' \dfrac{1 + k_1 r^2 + k_2 r^4 + k_3 r^6}{1 + k_4 r^2 + k_5 r^4 + k_6 r^6} + 2p_2 u_i' v_i' + p_2(r^2 + 2v_i'^2) \\ u_i'' = f_x x' + c_x \\ v_i'' = f_y y' + c_y \end{cases}.$$

Wherein the $f_x$ is a first focal length of the camera. The $f_y$ is a second focal length of the camera. The $c_x$ is a lateral offset of an image origin relative to an optical center imaging point, and the $c_y$ is a longitudinal offset of the image origin relative to the optical center imaging point. The $k_1$ is a first radial distortion coefficient of the camera, and the $k_2$ is a second radial distortion coefficient of the camera. The $k_3$ is a third radial distortion coefficient of the camera, and the $k_4$ is a fourth radial distortion coefficient of the camera. The $k_5$ is a fifth radial distortion coefficient of the camera, and the $k_6$ is a sixth radial distortion coefficient of the camera. The $p_1$ is a first tangential distortion coefficient of the camera, and the $p_2$ is a second tangential distortion coefficient of the camera.

A third aspect of the disclosure is to provide an electronic device, which includes a memory and a processor. The memory is connected to the processor. The memory stores a computer program. The above method for calibrating image distortion is implemented when the computer program is processed by the processor.

A fourth aspect of the disclosure is to provide a computer readable storage medium having stored therein a computer program is provided. The computer program is executed by a processor to implement the above method for calibrating image distortion.

According to the method, apparatus, the electronic device, and storage medium for calibrating image distortion of the above aspects, when foreground objects (for example, a human image) are present in the original image and the deformation degree of the foreground objects is greater than the predetermined threshold, the distortion calibration and the spherical projection are performed on the original image to avoid deformation of the foreground objects due to distortion calibration. Thus, the calibration effect of the foreground object in the target image is good, and the calibrating effect is aesthetic and natural. In addition, since the processing method for the distortion calibration and the spherical projection has a smaller calculation amount, the calculation requirement of the calculation platform is low, and the target image can be previewed in real time.

DETAILED DESCRIPTION OF THE EMBODIMENTS

In order to make the objectives, technical solutions, and advantages of the present disclosure clearer, the present disclosure will be further described in detail below with reference to the accompanying drawings and embodiments. It should be understood that the specific embodiments described herein are merely intended to explain the present disclosure and are not intended to limit the present disclosure.

Figure 1:
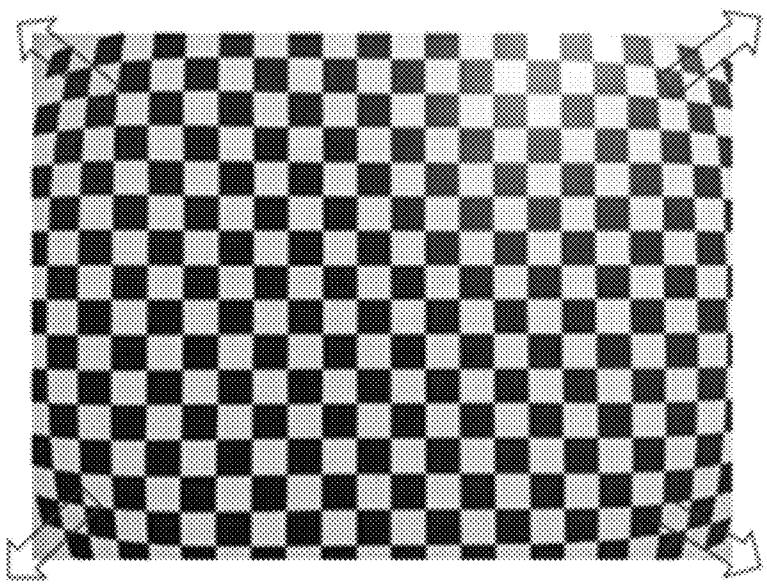
FIG. 1 is an original image captured by an ultra-wide-angle camera according to an embodiment.

The original image captured by the ultra-wide-angle camera module generally has image distortion. FIG. 1 shows the original image captured by the ultra-wide-angle camera module. As shown in FIG. 1, due to the distortion characteristic of the wide-angle lens, the distortion of the original image in the region image farther from the center of the image is more pronounced.

Figure 2:
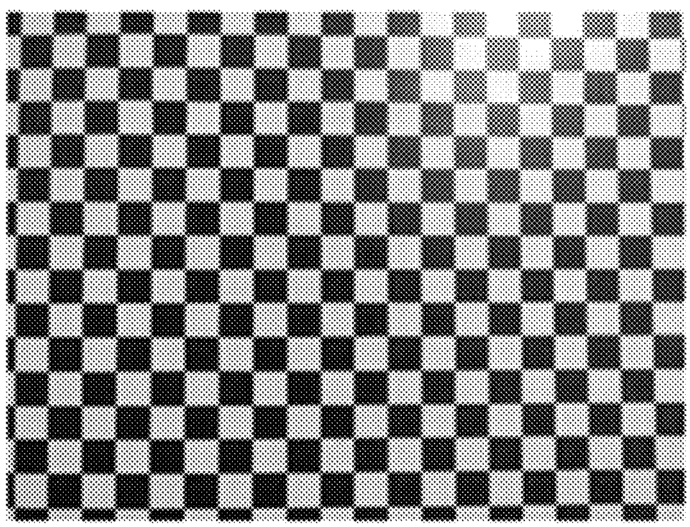
FIG. 2 is a reference diagram obtained by performing distortion calibration on an original image according to an embodiment.

In order to eliminate the distortion in the image, the original image may be subjected to distortion calibration by using the internal parameters of the ultra-wide-angle camera module, and the distortion calibrated image is shown in FIG. 2. Due to the operation of distortion calibration similar to stretching, for more severe regions of distortion in the original image, more intense stretching needs to be applied to eliminate distortion. Therefore, the distortion calibration is more stretched for the regions farther from the center of the image in the original image. If there is a foreground object in these regions, for example, there is a face at the four corners of the image, the face in the distortion calibrated image may cause a proportional disorder caused by stretching.

In some embodiments, the original image may be distortion calibrated using a mesh point optimization method based on the least square method. The calculation amount of the mesh point optimization method based on the least square method is large, the calculation capability of the computing platform is required to be high, the time consumption is long, and it usually takes several seconds to complete the calibration. In other embodiments, a method based on face keypoint detection may be adopted, and when deformation of a face is detected, shape adjustment is performed on a face area. The method based on face keypoint detection may be erroneous, resulting in poor image calibration effect.

Figure 3:
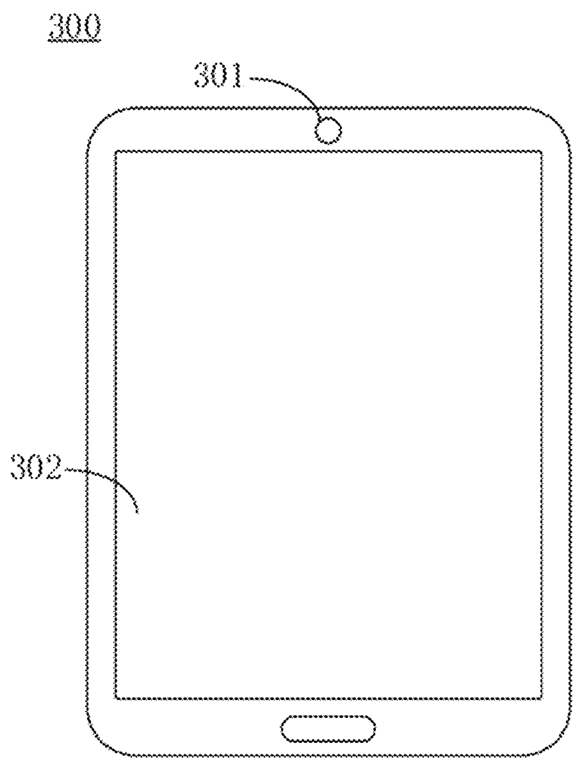
FIG. 3 is a schematic diagram of an electronic device according to an embodiment.

The method for calibrating image distortion provided in the present disclosure can be applied to the electronic device 300 shown in FIG. 3. The electronic device 300 can be, but is not limited to, various smart phones, digital cameras, personal computers, notebook computers, tablet computers, etc. The electronic device 300 may be equipped with a camera 301, and the electronic device 300 captures an original image in real time through the camera 301 and performs the method for calibrating image distortion in the embodiment of the present disclosure on the original image, so as to perform distortion calibration on the original image to obtain a calibrated target image. The electronic device 300 may further include a display screen 302, so that the electronic device 300 may display the calibrated target image on the display screen 302 in real time for viewing by the user. For example, when the user takes an image using the camera 301 of the electronic device 300, the image captured by the camera 301 may be previewed on the display screen 302 in real time, and the user may view the image previewed on the display screen 302 at any time and perform a shooting operation.

Figure 4:
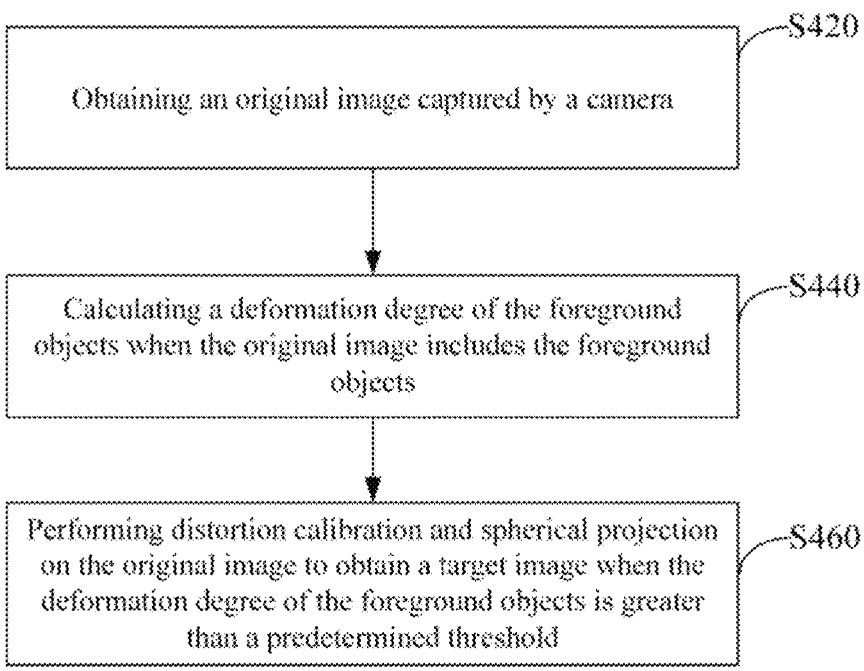
FIG. 4 is a flowchart of the method for calibrating image distortion according to an embodiment.

In an embodiment, a method for calibrating image distortion is provided, which can be applied to the electronic device 300 shown in FIG. 3. As shown in FIG. 4, the method includes the following steps S420 to S460.

S420: obtaining an original image captured by a camera.

In this embodiment, the camera may be an ultra-wide-angle camera, and the lens in the ultra-wide-angle camera may be an ultra-wide-angle lens. In various embodiments of the present disclosure, the cameras may include various types of device capable of capturing images, such as a camera, a camera module, etc.

The original image is an unprocessed image captured by a camera. In this embodiment, taking the method applied to the electronic device 300 as an example, the camera 301 of the electronic device 300 captures the original image in real time and transmits it to the processor of the electronic device 300, so that the electronic device 300 acquires the original image. In other embodiments, the original images may also be downloaded from the network or transmitted from other terminal device to the electronic device 300, or the electronic device 300 may also read the original image or the like from its own memory.

S440: calculating a deformation degree of the foreground objects when the original image includes the foreground objects.

The original image may include foreground objects or may not include foreground objects. The foreground objects refer to, for example, a target object that is captured within the field of view of the camera, for example, a human image, an animal, a food, and the like. In the original image, a portion other than the foreground objects is a background. The background refers to other content other than the target object photographed within the field of view of the camera, such as a far mountain, a sky, a building, an indoor or outdoor environment, and the like. Compared to the foreground object, the background is generally farther away from the camera in the object space. Accordingly, compared to the background, the foreground objects are generally closer to the camera in the object space.

The deformation degree of the foreground objects refers to the deformation degree of the form of the foreground objects presented in the original image relative to the original form of the foreground object (for example, the form presented by photographing the foreground object with a standard lens).

S460: performing distortion calibration and spherical projection on the original image to obtain a target image when the deformation degree of the foreground objects is greater than a predetermined threshold.

The distortion calibration refers to calibrating the distortion of the captured image due to camera lens distortion. The distortion mainly includes radial distortion and tangential distortion. The internal parameters of camera of the camera module can be used to correct the distortion of the original image. The internal parameters of the camera are inherent parameters of the camera, and after the manufacture of the camera is completed, the internal parameters of the camera are determined. The internal parameters of camera may be obtained from a manufacturer or may be obtained by calibrating the camera.

The camera may be calibrated by using a linear calibration method, a nonlinear optimization calibration method, a calibration method proposed by Zhengyou Zhang, or other common calibration methods, and the calibration method is not limited in the present disclosure as long as the internal parameters parameter of the camera can be acquired. After acquiring the internal parameters, according to the internal parameters, the deformation of the captured original image caused by the radial distortion and tangential distortion of the lens of the camera itself may be calibrated. An existing distortion calibration technology may be used to perform distortion calibration on the original image, and an algorithm for distortion calibration is not limited in this embodiment.

Spherical projection is to deform the image to obtain the visual effect after projecting the plane image onto the spherical surface. It refers to the use of spherical perspective projection model to correct the image. It is a common image processing method.

In this step, the distortion calibration and the spherical projection are performed on all regions of the original image. For example, the distortion calibration and the spherical projection may be performed on all pixel points in the original image. In this way, the foreground objects and the background in the original image do not need to be distinguished, and the image calibration speed is accelerated. Further preferably, In the above embodiment, when foreground objects are present in the original image and the deformation degree of the foreground objects is greater than a predetermined threshold, the distortion calibration and the spherical projection are performed on the original image, so as to avoid deformation of the foreground object due to the distortion calibration, so that the calibration effect of the foreground object in the target image is good, and the imaging is beautiful and natural. In addition, since the processing method of distortion calibration and spherical projection has a smaller calculation amount, the calculation requirement of the calculation platform is low, and the target image can be previewed in real time.

For example, taking the method for calibrating image distortion applied to the electronic device 300 shown in FIG. 3 as an example, a target image by using the method for calibrating image distortion of the present embodiment is obtained from the original image captured by the camera 301 obtains, and the target image can be displayed on the display screen 302 in real time. According to the method for calibrating image distortion of the present disclosure, the process of correcting an original image to obtain a target image needs only a few milliseconds, and therefore, real-time previewing of the target image does not delay, thereby improving user experience.

Figure 5:
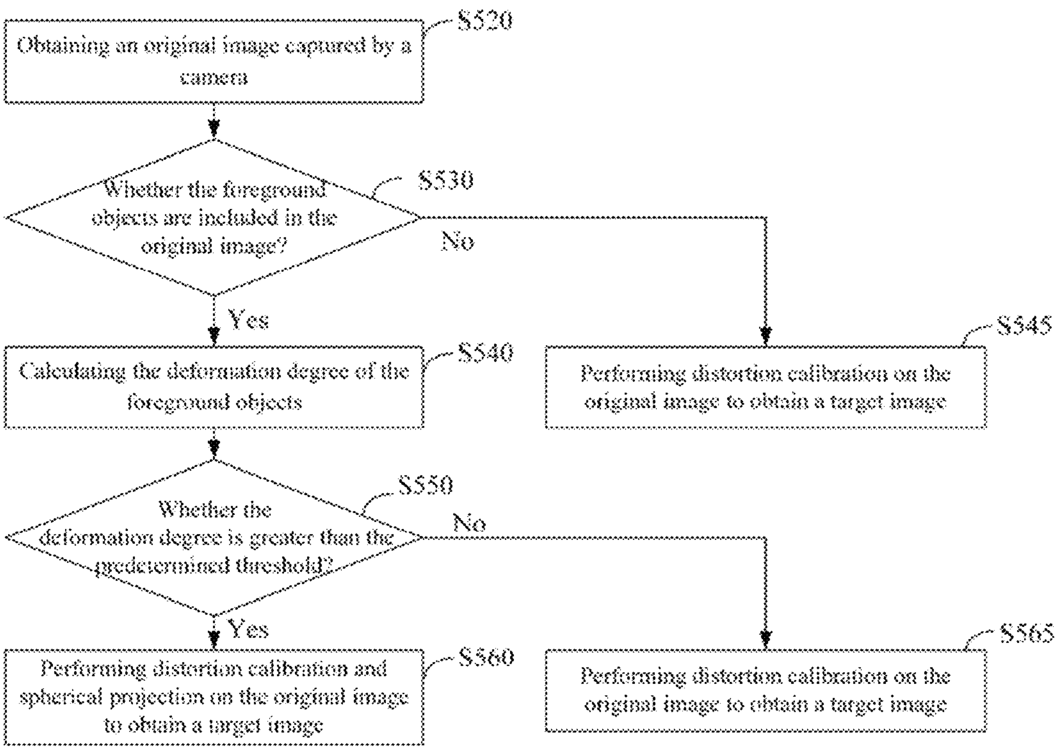
FIG. 5 is a flowchart of the method for calibrating image distortion according to an embodiment.

Referring to FIG. 5, in an embodiment, the method for calibrating image distortion according to the present disclosure includes the following steps S520 to S560.

S520: obtaining an original image captured by a camera.

Step S520 is the same as step S420 described above and is not described herein again.

S530: determining whether the foreground object is included in the original image.

Taking a human image of the foreground objects as an example, a face detection technology is used for the original image to detect whether a face is included in the original image. The face detection technology is, for example. Adaboost+haar detection, depth model detection, etc. If it is detected that the original image includes a face, it is determined that the original image includes a human image, otherwise, it is determined that the original image does not include a human image.

In other embodiments, the foreground objects may be other target objects, such as animals, foods, etc., and may be detected using corresponding neural network recognition techniques. It should be understood that the original image may or may not include one or more foreground objects.

When it is determined that the original image includes the foreground objects, the processing proceeds to S540; otherwise, the processing proceeds to S545.

S540: calculating the deformation degree of the foreground object.

In an embodiment, calculating the deformation degree of the foreground object may include the following steps.

A foreground object border in the original image, a position parameter of the foreground object border, and a size parameter of the foreground object border are obtained. And The deformation degree of the foreground object border based on the position parameter of the foreground object border and the size parameter of the foreground object border is calculated.

Taking a human image of the foreground objects as an example, the foreground object border may be a face border. Exemplarily, the face border may be obtained by a method based on depth learning. After the foreground object border is acquired, the coordinates of the pixel points of the foreground object border may be acquired, thereby obtaining the position parameter of the foreground object border and the size parameter of the foreground object border. It should be understood that when the original image includes multiple foreground objects, multiple foreground object border corresponding to the multiple foreground objects are respectively obtained.

The coordinates of the pixel points refer to the coordinates of each pixel point in the image. For example, the coordinates of the pixel point at the leftmost upper corner of the image may be set as (0, 0), the coordinates of the pixel points adjacent to the right side of the pixel point at the leftmost upper corner are set as (1, 0), and the coordinates of the pixel points adjacent to the lower side of the pixel point at the leftmost upper corner are set as (0,1), and so on. It should be understood that the coordinates of the pixel points may also be set according to other rules, for example, the coordinates of the center point of the image may be set as (0, 0), etc.

Figure 6:
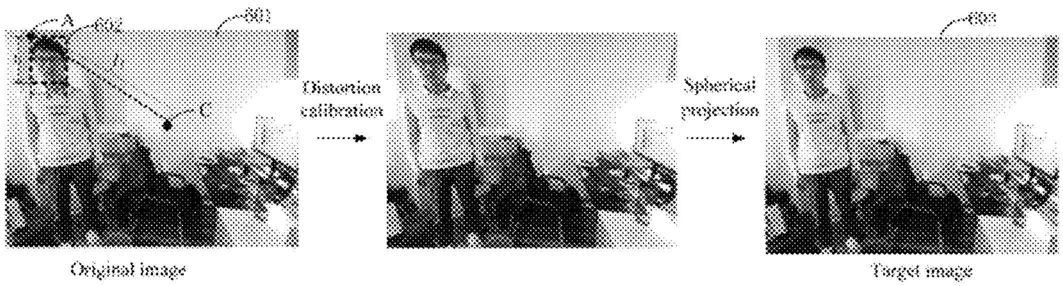
FIG. 6 is a schematic diagram of applying the method for calibrating image distortion according to an embodiment.

In a preferred embodiment, referring to FIG. 6, the position parameter of the foreground object border 602 includes a distance $l_1$ between the foreground object border 602 and a center point C of the original image 601 in the original image 601. For example, the distance between the point A at the leftmost upper corner of the foreground object border 602 and the center point C of the original image 601 may be acquired as the distance $l_1$. The distance may be determined by calculating a distance between the coordinates of the pixel points of point A and the coordinates of the pixel points of point C. It should be understood that the distance between other points of the foreground object border 602 and the center point C of the original image 601 may also be acquired as the distance $l_1$.

The size parameter of the foreground object border 602 includes a width w of the foreground object border 602 and a height h of the foreground object border 602. It should be understood that the above dimensional parameters may also be determined by the coordinates of the pixel points of the foreground object border 602. For example, the height h of the foreground object border 602 is obtained by subtracting the minimum value of the ordinate from the maximum value of the ordinate in the coordinates of the pixel points of the foreground object border 602. The width w of the foreground object border 602 is obtained by subtracting the minimum value of the abscissas from the maximum value of the abscissas in the coordinates of the pixels of the foreground object border 602.

In an embodiment, the deformation degree of the foreground object is calculated based on $$S=w_1\times l_1+w_2\times l_2$$

Where the S is the deformation degree of the foreground object. The $l_1$ is the distance between the foreground object border and the center point of the original image in the original image. The $l_2$ is a larger value of the width of the foreground object border and the height of the foreground object border. The $w_1$ is a first weight value. And the $w_2$ is a second weight value.

The $w_1$ and the $w_2$ involve the effects of the $l_1$ and the $l_2$ on the deformation degree, respectively. It should be understood that the values of the $w_1$ and the $w_2$ are associated with the values of the predetermined threshold and can be set according to the actual situation. In a preferred embodiment, the $w_2$ may be greater than the $w_1$. As shown in FIG. 6, the size of the original image is the same as that of the target image. It should be understood that the coordinates of the center point of the original image are the same as those of the center point of the resulting image.

When it is detected in step S530 that multiple foreground objects are included in the original image, the above formula can be applied to the foreground object border corresponding to the multiple foreground objects to calculate the deformation degree of the multiple foreground objects respectively.

S545: performing distortion calibration on the original image to obtain a target image.

When the foreground image is not included in an original image, since the process of distortion calibration does not cause serious distortion of the content of the original image, only the distortion calibration of the original image may be performed to obtain the target image. Thus, the time for performing the image calibration processing is saved.

S550: determining whether the deformation degree is greater than a predetermined threshold.

As can be seen from the foregoing steps, when multiple foreground objects are detected in step S530, the deformation degrees of the multiple foreground objects are calculated in step S540 respectively. In this case, the foreground object having the largest deformation degree among the multiple foreground objects is acquired, and it is determined whether the deformation degree of the foreground object having the largest deformation degree is greater than the predetermined threshold.

If it is determined that the degree of deformation is greater than the predetermined threshold, the processing proceeds to step S560: otherwise, the processing proceeds to step S565.

S560: performing the distortion calibration and the spherical projection on the original image to obtain a target image.

This step is similar to step S460 in the foregoing embodiment and is not described herein again.

S565: performing the distortion calibration on the original image to obtain a target image.

When the deformation degree of the current foreground objects does not exceed the predetermined threshold, since the processing of distortion calibration does not cause serious distortion of the foreground object, only the original image may be distortion calibrated to obtain the target image. Thus, the time for performing the image calibration processing is saved.

For example, referring to FIG. 1, The closer to the center point of the original image, the less obvious the image distortion is, and the farther away from the center point of the original image, the more serious the image distortion is. Therefore, if the foreground objects are located near the center point of the original image, there may be no distortion, or the deformation degree may be ignored. In this case, performing distortion calibration on the original image causes a smaller distortion of the foreground objects or does not cause a distortion of the foreground objects.

Figure 7:
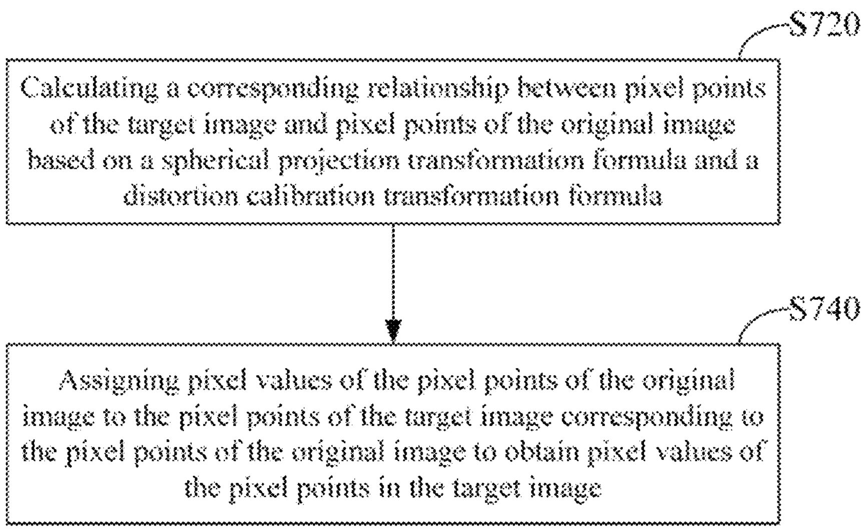
FIG. 7 is a flowchart of the method for calibrating image distortion according to an embodiment.

Referring to FIG. 7, in an embodiment, step S460 or step S560 specifically includes the following steps S720 and S740.

S720: based on a spherical projection transformation formula and a distortion calibration transformation formula, calculating a corresponding relationship between pixel points of the target image and pixel points of the original image.

Figure 8:
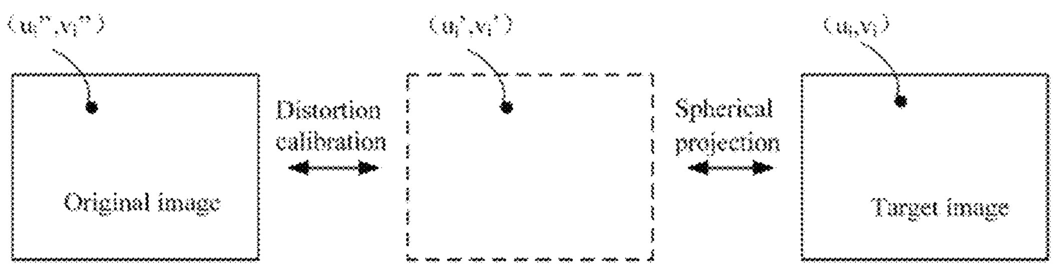
FIG. 8 is a mapping relationship diagram of coordinates of pixel points of an original image and a target image according to an embodiment.

Referring further to FIG. 8, $(u_i, v_i)$ represents coordinates of pixel points in the target image, $u_i$ is an abscissa, and $v_i$ is an ordinate. $(u_i'', v_i'')$ represents the coordinates of the pixel points in the original image, $u_i''$ is an abscissa, and $v_i''$ is an ordinate.

After distortion calibration on the original image is performed, the coordinates $(u_i'', v_i'')$ of the pixel points of the original image are converted into the coordinates $(u_i', v_i')$ of the pixel points after performing distortion calibration on the original image. After distortion calibration on the original image is performed, the coordinates $(u_i', v_i')$ of the pixel points after performing distortion calibration are convened into the coordinates $(u_i, v_i)$ of the pixel points of the target image by spherical projection. $(u_i, v_i)$ corresponds to $(u_i', v_i')$ by the spherical projection transformation formula, and $(u_i', v_i')$ corresponds to $(u_i'', v_i'')$ by the distortion calibration transformation formula. Referring to FIG. 8, it should be understood that a pixel point, after performing distortion calibration on the original image, is a pixel point before performing spherical projection on the target image.

In brief, the pixel points $(u_i, v_i)$ in the target image are converted into pixel points $(u_i'', v_i'')$ of the original image by the distortion calibration transformation formula and the spherical projection transformation formula. The pixel value of the pixel points represented by $(u_i, v_i)$ in the target image corresponds to the pixel value of the pixel points represented by $(u_i'', v_i'')$ in the original image. Each pixel point in the target image is mapped to a pixel point in the original image.

After the corresponding relationship between the pixel points of the target image and the pixel points of the original image is calculated, the pixel values of the pixel points of the original image may be acquired. However, the coordinates of the pixel points in the original image corresponding to the coordinates of the pixel points in the target image calculated by the spherical projection transformation formula and the distortion calibration transformation formula are generally not integers, i.e., $u_i''$ and $v_i''$ are generally not integers. Therefore, the "pixel point of the original image" calculated according to the present disclosure may not be a standard pixel in an image and may be considered as a point in the original image. At this time, the pixel values of the pixel points of the original image whose coordinates are not integers may be obtained by using an interpolation algorithm (for example, a bilinear interpolation algorithm, a bicubic interpolation algorithm, and a nearest neighboring interpolation algorithm). Taking a bilinear interpolation algorithm as an example, if the coordinates of the pixel points in the corresponding original image calculated by using the spherical projection transformation formula and the distortion calibration transformation formula are (1.1, 2.3), bilinear interpolation calculation is performed using four pixel points with coordinates (1, 2), (2, 3) and (1, 3) being integers in the original image, to obtain pixel values with coordinates (1.1, 2.3) of the pixel points in the original image. Calculating a pixel value by using an interpolation algorithm belongs to a common technique for image processing, and the specific calculation method is not described herein again. It should be understood that various interpolation algorithms can be used to calculate pixel values, which is not limited in the present disclosure.

In some embodiments, all pixel points in the target image are traversed, and a spherical projection transformation and a distortion calibration transformation are applied for coordinates of all pixel points in the target image to calculate coordinates of pixel points in its corresponding original image.

In other embodiments, preferably, spherical projection transformation formula and distortion calibration transformation formula may be applied only to the coordinates of some pixel points in the target image. In this case, the target image may be divided into multiple rectangular blocks according to a certain width interval and height interval, and the spherical projection transformation formula and the distortion calibration transformation formula are applied to vertices of the multiple rectangular blocks in the target image, so as to calculate coordinates of pixel points in the original image corresponding thereto. For the vertices of the rectangular block, this process is similar to that of the above-described embodiments and is not described herein.

For other pixel points (not vertex pixel points) in the target image, the coordinates of four-pixel points in the original image obtained by mapping the coordinates of the four vertices closest to the pixel point are used to calculate the coordinates of the pixel point in the original image corresponding to the pixel point by using a bilinear interpolation algorithm.

Figure 9:
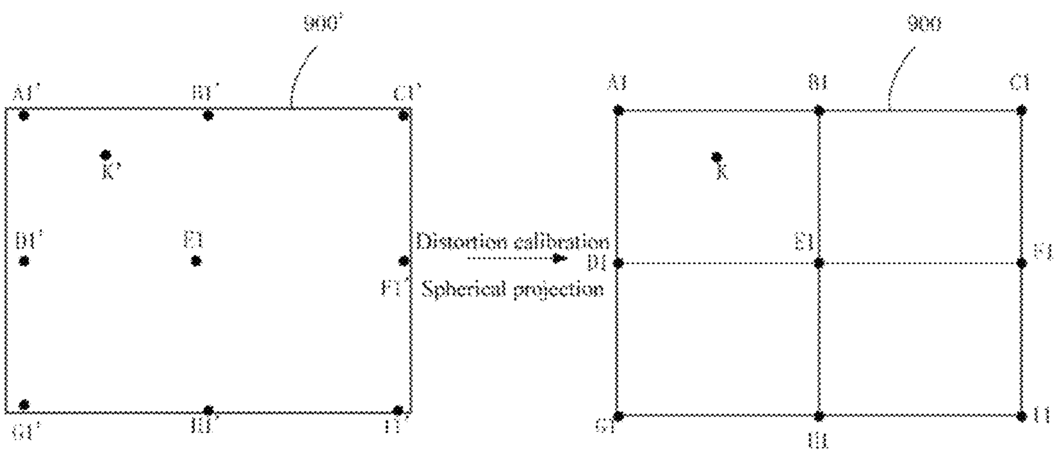
FIG. 9 is a mapping relationship diagram of coordinates of pixel points of an original image and a target image according to an embodiment.

As shown in FIG. 9, in this example, the target image 900 is divided into four rectangular blocks. For vertices A1, B1, C1, D1, E1, F1, G1, H1, and I1 of four rectangular blocks, spherical projection formula and distortion calibration transformation formula are applied, pixel points A1', B1', C1', D1', E1', F1', G1', H1', and I1' of the original image 900' corresponding to these points are respectively calculated, and coordinates of the pixel points of the original image 900' corresponding to these points are obtained. For the remaining pixel points, for example, K point, the coordinates of the pixel points K' of the corresponding original image 900' are calculated by using a bilinear interpolation algorithm using the coordinates of the points A1', B1', D1' and E1' in the original image.

In this way, by applying spherical projection transformation formula and distortion calibration transformation formula to some pixel points and bilinear interpolation algorithm to other pixel points, a corresponding relationship between all pixel points in the target image and pixel points in the original image is obtained, that is, the coordinates of pixel points in the original image corresponding to all pixels in the target image are obtained, and then, the pixel values of the pixel points of the original image are obtained by interpolation algorithm. In this embodiment, the spherical projection transformation formula and distortion calibration transformation formula need not be applied to the coordinates of all the pixel points in the target image, and the calculation amount is further reduced.

S740: assigning pixel values of the pixel points of the original image to the pixel points of the target image corresponding to the pixel points of the original image to obtain pixel values of the pixel points in the target image.

In this step, distortion calibration and spherical projection are performed on the original image to obtain a target image. In practical processing, generally, reverse calculation is performed. That is, for each pixel point in the target image, the pixel point of the original image corresponding to the pixel point is obtained by using the spherical projection transformation formula and the distortion calibration transformation formula, and a pixel value of the pixel point of the original image is assigned to the pixel point of the target image corresponding to the pixel point of the original image, and a pixel value of each pixel point in the target image is obtained, thereby obtaining a target image with the pixel values. In other words, when the inverse calculation is not performed by the spherical projection transformation formula and the distortion calibration transformation formula, the pixel points in the target image do not have pixel values. The pixel values are assigned to the pixel points in the target image by reverse calculation, thereby obtaining a target image with the pixel values.

For example, for the pixel points ($u_0$, $v_0$) of the target image, the coordinates of the corresponding pixel points of the original image are ($u_0''$, $v_0''$) calculated by distortion calibration transformation formula and spherical projection transformation formula. The pixel value (also known as the color value) of the pixel point with coordinates ($u_0''$, $v_0''$) in the original image is obtained, and then the pixel value is assigned to the pixel point ($u_0$, $v_0$) of the target image so that the pixel value corresponding to the pixel point ($u_0$, $v_0$) of the target image is the same as the pixel value corresponding to the pixel point ($u_0''$, $v_0''$) of the original image.

In an embodiment, the above-mentioned spherical projection transformation formula is:

$$\begin{cases} r_0 = \dfrac{d}{2 * \tan(0.5 * \arctan(d/(2 * f)))} \\ r_2 = f * \tan(2 * \arctan(r_1/r_0)) \end{cases}.$$

Wherein, the d is a smaller value in the width and height of the original image. The f is a focal length of the camera; the $r_1$ is a distance from the pixel point of the target image to the center point of the target image. The $r_2$ is a distance from the pixel point of the distortion calibration image to the center point of the target image. The pixel points ($u_i$, $v_i$) of the target image, the corresponding pixel points ($u_i'$, $v_i'$) after performing distortion calibration on the original image, and a center point of the target image are on a same straight line.

In an embodiment, the above-mentioned distortion calibration transformation formula is:

$$\begin{cases} r = \sqrt{u_i'^2 + v_i'^2} \\ x' = u_i' \dfrac{1 + k_1 r^2 + k_2 r^4 + k_3 r^6}{1 + k_4 r^2 + k_5 r^4 + k_6 r^6} + 2 p_1 u_i' v_i' + p_2 (r^2 + 2 u_i'^2) \\ y' = v_i' \dfrac{1 + k_1 r^2 + k_2 r^4 + k_3 r^6}{1 + k_4 r^2 + k_5 r^4 + k_6 r^6} + 2 p_2 u_i' v_i' + p_2 (r^2 + 2 v_i'^2) \\ u_i'' = f_x x' + c_x \\ v_i'' = f_y y' + c_y \end{cases}.$$

Wherein, the $f_x$ is a first focal length of the camera, the $f_y$ is a second focal length of the camera. The $c_x$ is a lateral offset of an image origin relative to an optical center imaging point. The $c_y$ is a longitudinal offset of the image origin relative to the optical center imaging point. The $k_1$ is a first radial distortion coefficient of the camera. The $k_2$ is a second radial distortion coefficient of the camera. The $k_3$ is a third radial distortion coefficient of the camera. The $k_4$ is a fourth radial distortion coefficient of the camera. The $k_5$ is a fifth radial distortion coefficient of the camera. The $k_6$ is a sixth radial distortion coefficient of the camera. The $p_1$ is a first tangential distortion coefficient of the camera. The $p_2$ is a second tangential distortion coefficient of the camera. $f_x$, $f_y$, $c_x$ and $c_y$ are the internal parameters of the camera, $k_1$, $k_2$, $k_3$, $k_4$, $k_5$, $k_6$, $p_1$, and $p_2$ are the distortion coefficients of the camera, which are the inherent parameters of the camera and are obtained by calibrating the camera.

Referring again to FIG. 6, according to the method for calibrating image distortion of the above embodiments, when a foreground object (for example, a human image) is present in the original image 601 and the deformation degree of the foreground object is greater than a predetermined threshold, distortion calibration and spherical projection are performed on the original image to obtain a target image 603. As can be seen from FIG. 6, if only the original image 601 is subjected to distortion calibration, the human image will be stretched and distorted. The calibrating method combining spherical projection and distortion calibration is adopted. Spherical projection can compensate the deformation of the foreground object caused by distortion calibration, avoid the deformation of the foreground object due to distortion calibration, and make the calibration effect of the foreground object in the target image good, and the imaging is beautiful and natural. The method for calibrating image distortion according to the present disclosure is particularly applicable to correcting an ultra-wide-angle image including a human image. In an ultra-wide-angle image, when a foreground object is a human image, a user is more concerned about whether the human image is deformed. With the method for calibrating image distortion according to the present disclosure, it is possible to avoid deformation of a human image in a calibrated image due to stretching.

In addition, since the processing method for distortion calibration and spherical projection has a smaller calculation amount, the calculation requirement of the calculation platform is low, and the target image can be previewed in real time. Exemplarily, the method for calibrating image distortion according to the present disclosure may be applied to the electronic device 300 shown in FIG. 3. The electronic device 300 may display the calibrated target image in real time on the display screen 302 for viewing by the user. For example, the original image captured by the camera 301 may be acquired every predetermined time (for example, 1 millisecond), and the original image is calibrated using the method for calibrating image distortion according to the present disclosure to obtain a target image. Meanwhile, in view of the frequent switching of face appearance/disappearance in the actual scene, since the original image is obtained and calibrated every predetermined time, it is only necessary to judge whether there is human image deformation greater than the predetermined degree in the current original image during actual processing. And in the screen preview, a smooth transition of a process between human image deformation and no human image deformation can be realized, which improves the experience of the user.

The method for calibrating image distortion for ultra-wide-angle image provided by the disclosure can realize fast distortion calibration for ultra-wide-angle image with low computational complexity and obtain good calibration effect.

Figure 10:
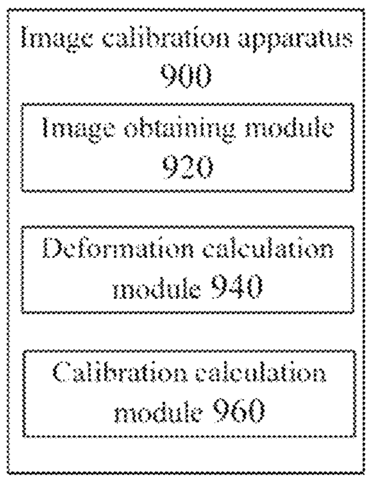
FIG. 10 is a schematic block diagram of a device for calibrating image distortion according to an embodiment.
Figure 11:
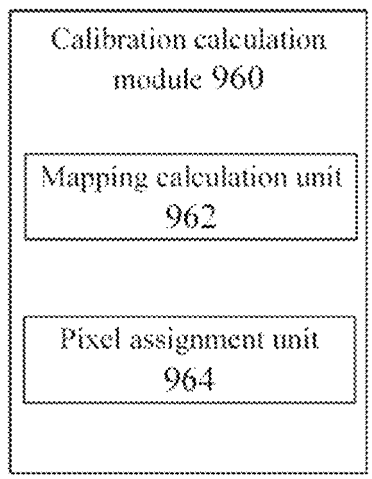
FIG. 11 is a schematic block diagram of a device for calibrating image distortion according to an embodiment.

Referring to FIG. 10, another aspect of the present disclosure provides an image calibration apparatus 900, which includes: an image obtaining module 920 configured to obtain an original image captured by a camera, a deformation calculation module 940 configured to calculate a deformation degree of foreground objects when the original image includes the foreground object, and a calibration calculation module 960 configured to perform distortion calibration and spherical projection on the original image when the deformation degree of the foreground object is greater than a predetermined threshold to obtain a target image.

In an embodiment, the calibration calculation module 90 is further configured to perform the distortion calibration on the original image to obtain a target image when the original image does not include a foreground object or perform the distortion calibration on the original image to obtain a target image when the deformation degree of the foreground object is not greater than the predetermined threshold.

In an embodiment, the deformation calculation module 940 is further configured to acquire a foreground object border in the original image, a position parameter of the foreground object border, and a size parameter of the foreground object border and calculate a deformation degree of the foreground object border based on the position parameter of the foreground object border and the size parameter of the foreground object border.

In an embodiment, the position parameter of the foreground object border includes a distance between the foreground object border and a center point of the original image in the original image. The size parameter of the foreground object border comprises: a width of the foreground object border and a height of the foreground object border.

The deformation calculation module 940 is further configured to calculate the deformation degree of the foreground object based on $$S=w_1\times l_1+w_2\times l_2.$$

Wherein, the S is the deformation degree of the foreground object. The $l_1$ is the distance between the foreground object border and the center point of the original image in the original image. The $l_2$ is a larger value of the width of the foreground object border and the height of the foreground object border. The $w_1$ is a first weight value. And the $w_2$ is a second weight value.

In an embodiment, the calibration calculation module 960 includes a mapping calculation unit 962 configured to calculate a corresponding relationship between pixel points of the target image and pixel points of the original image based on a spherical projection transformation formula and a distortion calibration transformation formula, and a pixel assignment unit 94 configured to assign pixel values of the pixel points of the original image to the pixel points of the target image corresponding to the pixel points of the original image to obtain pixel values of the pixel points in the target image.

In an embodiment, the mapping calculation unit 962 is configured to calculate coordinates ($u_i'$, $v_i'$) of the pixel points after performing distortion calibration on the original image corresponding to coordinates ($u_i$, $v_i$) of the pixel points of the target image based on the spherical projection transformation formula, wherein the pixel points of the target image, the corresponding pixel points after performing distortion calibration on the original image, and a center point of the target image are on a same straight line: and calculate coordinates ($u_i''$, $v_i''$) of the pixel points of the original image corresponding to coordinates ($u_i'$, $v_i'$) of the pixel points after performing distortion calibration on the original image based on the distortion calibration transformation formula.

The spherical projection transformation formula is:

$$\begin{cases} r_0 = \dfrac{d}{2*\tan(0.5*\arctan(d/(2*f)))} \\ r_2 = f*\tan(2*\arctan(r_1/r_0)) \end{cases}.$$

Wherein the d is a smaller value in the width and height of the original image. The f is a focal length of the camera. The $r_1$ is a distance from the pixel point of the target image to the center point of the target image. The $r_2$ is a distance from the pixel point of the distortion calibration image to the center point of the target image.

The distortion calibration transformation formula is:

$$\begin{cases} r=\sqrt{u_i'^2+v_i'^2} \\ x'=u_i'\dfrac{1+k_1r^2+k_2r^4+k_3r^6}{1+k_4r^2+k_5r^4+k_6r^6}+2p_1u_i'v_i'+p_2(r^2+2u_i'^2) \\ y'=v_i'\dfrac{1+k_1r^2+k_2r^4+k_3r^6}{1+k_4r^2+k_5r^4+k_6r^6}+2p_2u_i'v_i'+p_2(r^2+2v_i'^2) \\ u_i''=f_xx'+c_x \\ v_i''=f_yy'+c_y \end{cases}.$$

Wherein the/r is a first focal length of the camera, the $f_y$ is a second focal length of the camera. The $c_x$ is a lateral offset of an image origin relative to an optical center imaging point. The $c_y$ is a longitudinal offset of the image origin relative to the optical center imaging point. The $k_1$ is a first radial distortion coefficient of the camera. The $k_2$ is a second radial distortion coefficient of the camera. The $k_3$ is a third radial distortion coefficient of the camera. The $k_4$ is a fourth radial distortion coefficient of the camera. The $k_5$ is a fifth radial distortion coefficient of the camera. The $k_6$ is a sixth radial distortion coefficient of the camera. The $p_1$ is a first tangential distortion coefficient of the camera. And the $p_2$ is a second tangential distortion coefficient of the camera.

The image calibration apparatus of the disclosure corresponds to the method for calibrating image distortion of the disclosure one by one. It is hereby claimed that the technical features and beneficial effects described in the embodiments of the above method for calibrating image distortion are applicable to the embodiments of the image calibration apparatus.

For specific definition of the image distortion calibration device, reference may be made to the definition of the above method for calibrating image distortion, and details are not described herein again. Each module in the image distortion calibration device may be implemented in whole or in part by software, hardware, and a combination thereof. The above modules can be embedded in or independent of the processor in the computer device in the form of hardware or stored in the memory in the computer device in the form of software, so as to facilitate the processor to call and execute the corresponding operations of the above modules.

Figure 12:
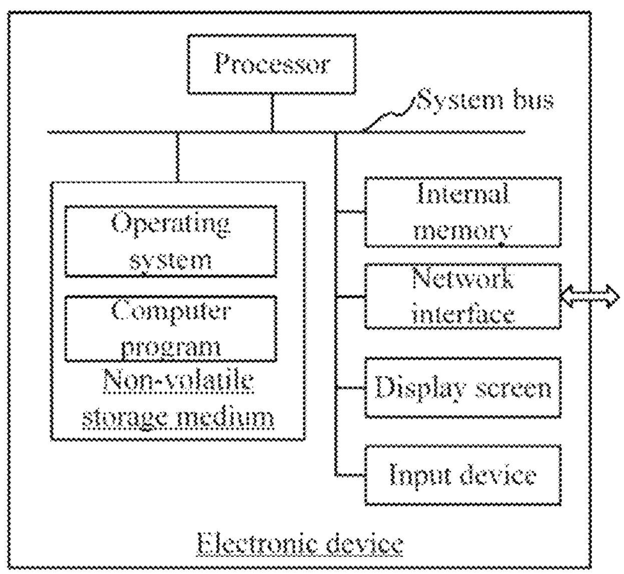
FIG. 12 is a schematic diagram of an internal structure of an electronic device according to an embodiment.

According to another aspect of the present disclosure, an electronic device is provided, and the electronic device may be a terminal, and an internal structural diagram thereof may be shown in FIG. 12. The electronic device includes a processor, a memory, a network interface, a display screen, and an input apparatus connected through a system bus. The processor of the electronic device is configured to provide computing and control capability. The memory of the electronic device includes a non-volatile storage medium and an internal memory. The non-volatile storage medium stores a step system and a computer program. The internal memory provides an environment for the running of the step system and the computer program in the non-volatile storage medium. The network interface of the electronic device is used for communicating with an external terminal via a network connection. The computer program is executed by the processor to implement a method for calibrating image distortion. The display screen of the electronic device may be a liquid crystal display screen or an electronic ink display screen, and the input apparatus of the electronic device may be a touch layer covered on the display screen, or may be a key, a trackball, or a touch pad disposed on a housing of the electronic device, or may also be an external keyboard, a touch pad, a mouse, or the like.

A person skilled in the art would understand that the structure shown in FIG. 12 is merely a block diagram of a part of the structure related to the solution of the present disclosure and does not constitute a limitation to the electronic device to which the solution of the present disclosure is applied, and the specific electronic device may include more or less components than those shown in the figure, or combine some components, or have different component arrangements.

In an embodiment, an electronic device is further provided, including a memory and a processor, where the memory stores a computer program, and the processor implements the steps in the foregoing embodiments of the above method when executing the computer program.

In an embodiment, a computer readable storage medium is provided, on which a computer program is stored, and the computer program is executed by a processor to implement the steps in the foregoing embodiments of the above method.

A person of ordinary skill in the art would understand that all or part of the processes of the method in the foregoing embodiments may be implemented by a computer program instructing relevant hardware. The computer program may be stored in a non-volatile computer readable storage medium. When the computer program is executed, the computer program may include the processes of the embodiments of the above method. Any reference to memory, storage, database, or other media used in the embodiments provided by the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in a variety of forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (Synchlink SLDRAM), rambus, direct RAM (RDRAM), direct rambus dynamic RAM (DRDRAM), and rambus dynamic RAM (RDRAM), and so on.

The technical features of the above embodiments can be combined arbitrarily. In order to make the description concise, all possible combinations of the technical features in the above embodiments are not described. However, as long as there is no contradiction in the combination of these technical features, it shall be considered to be the scope recorded in the specification.

The above embodiments merely express several embodiments of the present disclosure, and the description thereof is more specific and detailed, but cannot be construed as limiting the scope of the present disclosure. It should be noted that, for a person of ordinary skill in the art, several modifications and improvements can also be made without departing from the inventive concept, which all belong to the scope of protection of the present disclosure. Therefore, the scope of protection of the present disclosure shall be subject to the appended claims.

What is claimed is:

1. A method for calibrating image distortion, comprising:

obtaining an original image captured by a camera;

calculating a deformation degree of foreground objects when the original image includes the foreground objects, wherein the step of calculating the deformation degree of the foreground objects when the original image includes foreground objects comprises:

obtaining a foreground object border in the original image, a position parameter of the foreground object border, and a size parameter of the foreground object border; and calculating the deformation degree of the foreground object border based on the position parameter of the foreground object border and the size parameter of the foreground object border; and performing a distortion calibration and a spherical projection on the original image to obtain a target image when the deformation degree of the foreground objects is greater than a predetermined threshold.

2. The method of claim 1, further comprising:

performing the distortion calibration on the original image to obtain the target image when the original image does not include the foreground objects; or performing the distortion calibration on the original image to obtain a target image when the deformation degree of the foreground objects is not greater than the predetermined threshold.

3. The method of claim 1, wherein the position parameter of the foreground object border comprises:

a distance between the foreground object border and a center point of the original image in the original image;

the size parameter of the foreground object border comprises:

a width of the foreground object border and a height of the foreground object border;

the deformation degree of the foreground object is calculated based on $$S=w_1\times l_1+w_2\times l_2;$$

wherein the S is the deformation degree of the foreground object, the $l_1$ is the distance between the foreground object border and the center point of the original image in the original image, the $l_2$ is a larger value of the width of the foreground object border and the height of the foreground object border, the $w_1$ is a first weight value, and the $w_2$ is a second weight value.

4. The method of claim 1, wherein the step of performing the distortion calibration and a spherical projection on the original image to obtain the target image when the deformation degree of the foreground objects is greater than a predetermined threshold comprises:

calculating a corresponding relationship between pixel points of the target image and pixel points of the original image based on a spherical projection transformation formula and a distortion calibration transformation formula; and assigning pixel values of the pixel points of the original image to the pixel points of the target image corresponding to the pixel points of the original image to obtain pixel values of the pixel points in the target image.

5. The method of claim 4, wherein the step of calculating a corresponding relationship between pixel points of the target image and pixel points of the original image based on a spherical projection transformation formula and a distortion calibration transformation formula comprises:

calculating coordinates $(u_i', v_i')$ of the pixel points after performing distortion calibration on the original image corresponding to coordinates $(u_i, v_i)$ of the pixel points of the target image based on the spherical projection transformation formula, wherein the pixel points of the target image, the corresponding pixel points after performing distortion calibration on the original image, and a center point of the target image are on a same straight line;

calculating coordinates $(u_i'', v_i'')$ of the pixel points of the original image corresponding to coordinates $(u_i', v_i')$ of the pixel points after performing distortion calibration on the original image based on the distortion calibration transformation formula;

wherein the spherical projection transformation formula is:

$$\begin{cases} r_0 = \dfrac{d}{2*\tan(0.5*\arctan(d/(2*f)))} \\ r_2 = f*\tan(2*\arctan(r_1/r_0)) \end{cases}$$

wherein the d is a smaller value in the width and height of the original image; the f is a focal length of the camera; the $r_1$ is a distance from the pixel point of the target image to the center point of the target image, the $r_2$ is a distance from the pixel point of the distortion calibration image to the center point of the target image;

and the distortion calibration transformation formula is:

$$\begin{cases} r = \sqrt{u_i'^2 + v_i'^2} \\ x' = u_i'\dfrac{1+k_1r^2+k_2r^4+k_3r^6}{1+k_4r^2+k_5r^4+k_6r^6} + 2p_1u_i'v_i' + p_2(r^2+2u_i'^2) \\ y' = v_i'\dfrac{1+k_1r^2+k_2r^4+k_3r^6}{1+k_4r^2+k_5r^4+k_6r^6} + 2p_2u_i'v_i' + p_2(r^2+2v_i'^2) \\ u_i'' = f_xx' + c_x \\ v_i'' = f_yy' + c_y \end{cases}$$

wherein the $f_x$ is a first focal length of the camera, the $f_y$ is a second focal length of the camera, the $c_x$ is a lateral offset of an image origin relative to an optical center imaging point, and the $c_y$ is a longitudinal offset of the image origin relative to the optical center imaging point, the $k_1$ is a first radial distortion coefficient of the camera, and the $k_2$ is a second radial distortion coefficient of the camera, the $k_3$ is a third radial distortion coefficient of the camera, and the $k_4$ is a fourth radial distortion coefficient of the camera, the $k_5$ is a fifth radial distortion coefficient of the camera, the $k_6$ is a sixth radial distortion coefficient of the camera, the $p_1$ is a first tangential distortion coefficient of the camera, and the $p_2$ is a second tangential distortion coefficient of the camera.

6. An electronic device, comprising a memory and a processor, wherein the memory is connected to the processor;

the memory stores a computer program; and the processor implements the method of claim 1 when executing the computer program.

7. A non-transitory computer readable storage medium having stored therein a computer program, wherein the method of claim 1 is implemented when the computer program is executed by a processor.

8. An image calibration apparatus, comprising:

an image obtaining module, configured to obtain an original image captured by a camera;

a deformation calculation module, configured to calculate a deformation degree of foreground objects when the original image includes the foreground objects, wherein the deformation calculation module is further configured to:

obtain a foreground object border in the original image, a position parameter of the foreground object border, and a size parameter of the foreground object border; and calculate a deformation degree of the foreground object border based on the position parameter of the foreground object border and the size parameter of the foreground object border; and a calibration calculation module, configured to perform a distortion calibration and a spherical projection on the original image when the deformation degree of the foreground objects is greater than a predetermined threshold to obtain a target image.

9. The image calibration apparatus of claim 8, wherein the calibration calculation module is further configured to:

perform the distortion calibration on the original image to obtain the target image when the original image does not include the foreground objects; or perform the distortion calibration on the original image to obtain a target image when the deformation degree of the foreground object is not greater than the predetermined threshold.

10. The image calibration apparatus of claim 8, wherein the position parameter of the foreground object border comprises:

a distance between the foreground object border and a center point of the original image in the original image;

the size parameter of the foreground object border comprises:

a width of the foreground object border and a height of the foreground object border;

the deformation degree of the foreground object is calculated based on $$S=w_1\times l_1+w_2\times l_2;$$

wherein the S is the deformation degree of the foreground object, the $l_1$ is the distance between the foreground object border and the center point of the original image in the original image, the $l_2$ is a larger value of the width of the foreground object border and the height of the foreground object border, the $w_1$ is a first weight value, and the $w_2$ is a second weight value.

11. The image calibration apparatus of claim 8, wherein the calibration calculation module comprises:

a mapping calculation unit, configured to calculate a corresponding relationship between pixel points of the target image and pixel points of the original image based on a spherical projection transformation formula and a distortion calibration transformation formula; and a pixel assignment unit, configured to assign pixel values of the pixel points of the original image to the pixel points of the target image corresponding to the pixel points of the original image to obtain pixel values of the pixel points in the target image.

12. The image calibration apparatus of claim 11, wherein the mapping calculation unit is configured to:

calculate coordinates ($u_i'$, $v_i'$) of the pixel points after performing distortion calibration on the original image corresponding to coordinates ($u_i$, $v_i$) of the pixel points of the target image based on the spherical projection transformation formula, wherein the pixel points of the target image, the corresponding pixel points after performing distortion calibration on the original image, and a center point of the target image are on a same straight line; and calculate coordinates ($u_i''$, $v_i''$) of the pixel points of the original image corresponding to coordinates ($u_i'$, $v_i'$) of the pixel points after performing distortion calibration on the original image based on the distortion calibration transformation formula;

wherein the spherical projection transformation formula is:

$$\begin{cases} r_0 = \dfrac{d}{2*\tan(0.5*\arctan(d/(2*f)))} \\ r_2 = f*\tan(2*\arctan(r_1/r_0)) \end{cases}$$

wherein the d is a smaller value in the width and height of the original image; the f is a focal length of the camera; the $r_1$ is a distance from the pixel point of the target image to the center point of the target image, the $r_2$ is a distance from the pixel point of the distortion calibration image to the center point of the target image;

the distortion calibration transformation formula is:

$$\begin{cases} r = \sqrt{u_i'^2 + v_i'^2} \\ x' = u_i'\dfrac{1 + k_1r^2 + k_2r^4 + k_3r^6}{1 + k_4r^2 + k_5r^4 + k_6r^6} + 2p_1u_i'v_i' + p_2(r^2 + 2u_i'^2) \\ y' = v_i'\dfrac{1 + k_1r^2 + k_2r^4 + k_3r^6}{1 + k_4r^2 + k_5r^4 + k_6r^6} + 2p_2u_i'v_i' + p_2(r^2 + 2v_i'^2) \\ u_i'' = f_xx' + c_x \\ v_i'' = f_yy' + c_y \end{cases}$$

wherein the $f_x$ is a first focal length of the camera, the $f_y$ is a second focal length of the camera, the $c_x$ is a lateral offset of an image origin relative to an optical center imaging point, and the $c_y$ is a longitudinal offset of the image origin relative to the optical center imaging point; the $k_1$ is a first radial distortion coefficient of the camera, and the $k_2$ is a second radial distortion coefficient of the camera, the $k_3$ is a third radial distortion coefficient of the camera, and the $k_4$ is a fourth radial distortion coefficient of the camera, the $k_5$ is a fifth radial distortion coefficient of the camera, and the $k_6$ is a sixth radial distortion coefficient of the camera, the $p_1$ is a first tangential distortion coefficient of the camera, and the $p_2$ is a second tangential distortion coefficient of the camera.

* * * * *